United States Patent
Sugiyama

(10) Patent No.: US 6,889,418 B2
(45) Date of Patent: May 10, 2005

(54) METHOD OF PROCESSING MAGNETIC HEAD

(75) Inventor: Tomokazu Sugiyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/337,978

(22) Filed: Jun. 22, 1999

(65) Prior Publication Data

US 2001/0037555 A1 Nov. 8, 2001

(30) Foreign Application Priority Data

Nov. 24, 1998 (JP) .......................... 10-332315

(51) Int. Cl.$^7$ ................................ B23Q 7/00
(52) U.S. Cl. ................ 29/559; 29/603.01; 156/154; 156/309.6; 156/321; 156/322
(58) Field of Search ................ 29/459, 559, 603.01; 156/153, 154, 155, 309.6, 299, 321, 322

(56) References Cited

U.S. PATENT DOCUMENTS

| | | | | |
|---|---|---|---|---|
| 2,984,897 A | * | 5/1961 | Godfrey | 29/424 |
| 3,475,867 A | * | 11/1969 | Walsh | 51/281 |
| 3,571,984 A | * | 3/1971 | Koorneef et al. | 451/63 |
| 3,666,588 A | * | 5/1972 | Wanesky | 156/249 |
| 3,677,853 A | * | 7/1972 | Anzelone, Jr. et al. | 156/160 |
| 3,752,717 A | * | 8/1973 | White | 156/17 |
| 3,780,696 A | * | 12/1973 | Babbitt et al. | 118/49.5 |
| 3,888,053 A | * | 6/1975 | White et al. | 451/28 |
| 4,098,031 A | * | 7/1978 | Hartman et al. | 451/54 |
| 4,104,099 A | * | 8/1978 | Scherrer | 156/155 |
| 4,239,567 A | * | 12/1980 | Winings | 156/154 |
| 4,283,242 A | * | 8/1981 | Regler et al. | 156/154 |
| 4,300,965 A | * | 11/1981 | Schmidt et al. | 156/154 |
| 4,313,284 A | * | 2/1982 | Walsh | 451/288 |
| 4,316,757 A | * | 2/1982 | Walsh | 156/286 |
| 4,395,297 A | * | 7/1983 | Patterson | |
| 4,437,222 A | * | 3/1984 | Umehara | 29/527.4 |
| 4,930,260 A | * | 6/1990 | Itoh et al. | 451/245 |
| 4,995,199 A | * | 2/1991 | Miyoshi et al. | 451/57 |
| 5,036,630 A | * | 8/1991 | Kaanta et al. | 451/41 |
| 5,185,292 A | * | 2/1993 | VanVonno et al. | 438/59 |
| 5,232,532 A | * | 8/1993 | Hori | 156/163 |
| 5,256,599 A | * | 10/1993 | Asetta et al. | 438/458 |
| 5,273,615 A | * | 12/1993 | Asetta et al. | 156/584 |
| 5,310,441 A | * | 5/1994 | Tsutsumi et al. | 156/382 |
| 5,733,814 A | * | 3/1998 | Flesher et al. | 438/460 |
| 5,802,712 A | * | 9/1998 | Sakai et al. | 29/840 |
| 5,964,978 A | * | 10/1999 | Hirooka | 156/299 |
| 6,077,382 A | * | 6/2000 | Watanabe | 156/322 |
| RE36,890 E | * | 10/2000 | Wells et al. | 156/153 |
| 6,367,529 B1 | * | 4/2002 | Yanagisawa | 156/350 |

FOREIGN PATENT DOCUMENTS

| | | | | |
|---|---|---|---|---|
| JP | 59-32135 | | 2/1984 | |
| JP | 64-076418 | | 3/1989 | |
| JP | 2-277235 | | 11/1990 | |
| JP | 3-228567 | | 10/1991 | |
| JP | 404202390 A | * | 7/1992 | 156/322 |
| JP | 04-278208 | | 10/1992 | |
| JP | 07-176011 | | 7/1995 | |

* cited by examiner

*Primary Examiner*—Essama Omgba
(74) *Attorney, Agent, or Firm*—Greer, Burns & Crain, Ltd.

(57) ABSTRACT

The method of the present invention is capable of processing a work piece with higher accuracy and providing highly reliable magnetic heads. The method of processing the magnetic head comprises the steps of: providing adhesive wax on a surface of a supporting jig; pressing a work piece onto the surface of the supporting jig so as to adhere the work piece thereon; heating the work piece supported by the supporting jig until the wax is melted so as to release stress in the work piece; and processing the work piece.

5 Claims, 5 Drawing Sheets

METHOD OF PROCESSING MAGNETIC HEAD

BACKGROUND OF THE INVENTION

The present invention relates to a method of processing a magnetic head, more precisely relates to a method of processing a magnetic head, in which a work piece, which has been cut from a wafer and formed into a bar-shaped piece, is supported by a supporting jig and processed, e.g., lapped.

In the steps of manufacturing a magnetic head, MR-elements, etc. are formed in a wafer by forming film layers, etc., a plurality of bar-shaped pieces are formed by cutting the wafer, then sliders are made by processing, e.g., lapping, the bar-shaped pieces.

The present invention relates to a method of processing a raw bar which is formed by cutting the wafer. Namely, the work piece, which has been formed into a bar-shaped piece by cutting the wafer, is horizontally supported on a supporting jig, then it is properly processed by a proper manner, e.g., ELG-lapping.

In a conventional method, the work piece is pressed onto the supporting jig so as to adhere thereon with higher accuracy. However, stress in the work piece is released when the work piece is peeled from the supporting jig, so that the work piece is curved. Thus, in the following steps, the work piece is processed with monitoring height of the work piece, etc. Since the work piece is deformed in various directions, complex adjustment and treatment are required in the following steps, so that processing accuracy and processing efficiency are made lower.

In the conventional method, undulation of submicron is formed in the work piece by flatness of the jig, dusts in wax, and roughness of a surface of the work piece. These days, in film-layered magnetic heads, general allowance is ±0.5 μm, so errors caused by adhering the work piece cannot be ignored.

SUMMARY OF THE INVENTION

The present invention has been studied to solve the above described problems of the conventional method.

An object of the present invention is to provide a method of processing a magnetic head, which is capable of restricting deformation of the work piece, easily processing the work piece in following steps and improving the processing accuracy.

To achieve the object, the method of the present invention comprises the steps of: providing adhesive wax on a surface of a supporting jig; pressing a work piece onto the surface of the supporting jig so as to adhere the work piece thereon; heating the work piece supported by the supporting jig until the wax is melted so as to release stress in the work piece; and processing the work piece.

In the method, a plurality of elements may be serially arranged in the work piece in the longitudinal direction thereof, and a center part of the arranged line of the elements may be located nearest to the surface of the supporting jig when the work piece supported by the supporting jig is heated.

In the method, a plurality of elements may be serially arranged in the work piece in the longitudinal direction thereof, the arranged line of the elements, which is viewed from a side of the work piece, may be formed into a parabola line when the work piece supported by the supporting jig is heated, and the surface of the supporting jig may be deformed according to the arranged line.

By employing the method of the present invention, the work piece can be processed with higher processing accuracy, undulation of the work piece can be corrected. Therefore, the magnetic heads, which request the allowance of submicron order, can be processed with higher accuracy, and the reliable magnetic heads can be produced.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1A:
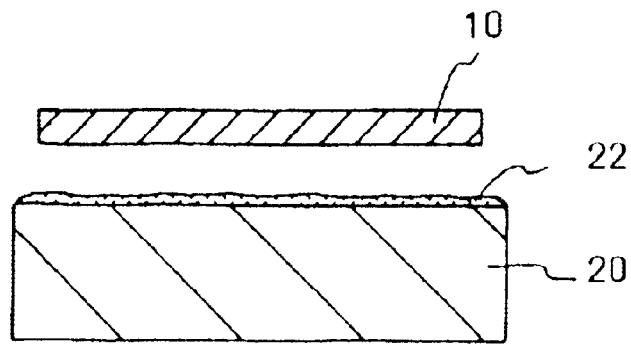
FIGS. 1A–1C are explanation views showing the steps of adhering a work piece onto a supporting jig.
Figure 1B:
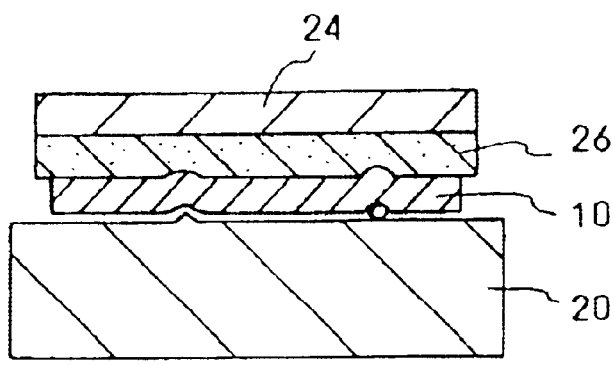
Figure 1C:
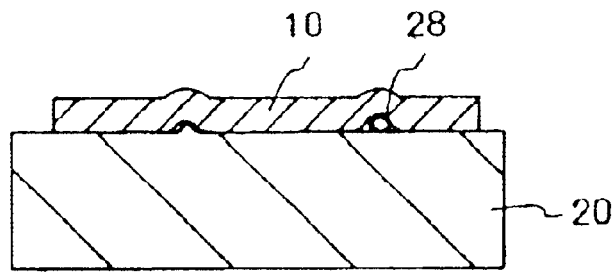

FIGS. 1A–1C show the steps of adhering a work piece 10 onto a supporting jig 20.

The work piece (raw bar) 10 is adhered onto a surface of the supporting jig 20 by wax 22, which has been provided on the surface thereof. To adhere the work piece 10, the supporting jig has been previously heated until reaching melting point of the wax 22, then the wax 22 is waxed on the surface thereof, and the work piece 10 is mounted on the supporting jig 20. Preferably, the work piece 10 is also previously heated.

Next, the work piece 10 is pressed, by a pressing jig 24, and cooled so as to precisely adhere the work piece 10. With this manner, the work piece 10 can be adhered according to roughness of the surface of the supporting jig 20.

A shock absorbing member 26, e.g., rubber, plastic, is adhered on a pressing face of the pressing jig 24, so that the work piece 10 is pressed onto the supporting jig 20 by the shock absorbing member 26. By providing the shock absorbing member 26, uneven thickness of the work piece 10 can be absorbed, so that the work piece 10 can be securely adhered.

In FIG. 1C, the work piece 10 is adhered on the supporting jig 20. The work piece 10 is adhered according to roughness of the surface of the supporting jig 20. If flatness of the supporting jig 20 is low or a dust 28 is included in the wax 22, their shapes are transferred onto a surface of the work piece 10 adhered.

After the work piece 10 is adhered on the supporting jig 20, a lapping step is executed. The steps of adhering the work piece 10 on the supporting jig 20 are executed in the method of the present invention as well as the conventional method.

Figure 6A:
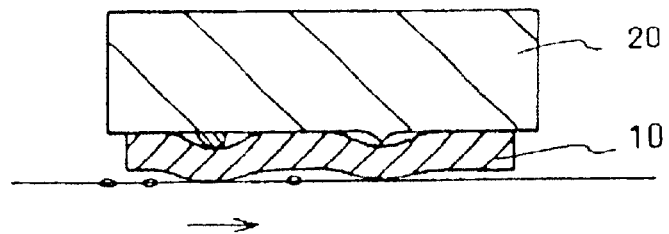
FIGS. 6A–6C are explanation views showing the steps of the conventional method of processing the work piece.
Figure 6B:
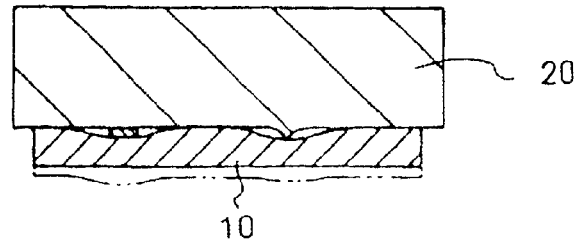
Figure 6C:
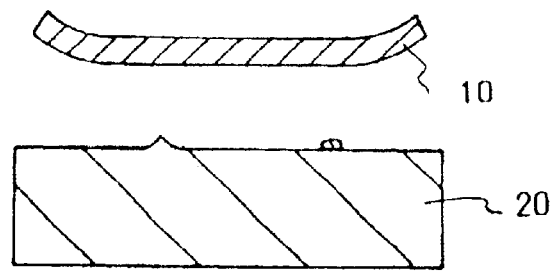

The conventional method will be explained with reference to FIGS. 6A–6C. In the conventional method, the lapping step (see FIG. 6A)) is executed after the work piece 10 is adhered to the supporting jig 20. In FIG. 6B, a surface of the work piece 10 has been lapped. In FIG. 6C, the work piece 10 is curved after the lapping step is completed and the work piece 10 is peeled from the supporting jig 20. Stress in the lapped surface of the work piece 10 is released by lapping work; stress in the adhered surface of the work piece 10 is released by peeling the work piece 10 from the supporting jig 20. With this mechanism, the work piece 10 is curved. In the conventional method, following processing steps will be executed with monitoring or sensing the deformation of the work piece 10 as described before.

The method of the present embodiment will be explained with reference to FIGS. 2A–2D. The characteristic point of the present embodiment is that the work piece 10, which has been adhered on the supporting jig 20, is reheated and then processed. Namely, the work piece 10 adhered on the supporting jig 20 is reheated and then following process, e.g., lapping, is executed. An object of reheating the work piece 10 is to melt the wax 22 and to relieve the concentrated stress in the work piece 10.

The wax 22 is liquefied and the stress in the work piece 10 is relieved by the reheating step, then the work piece 10 is adhered onto the supporting jig 20. The work piece 10, etc. are naturally cooled without pressing the work piece 10 (see FIG. 2A)).

Figure 2A:
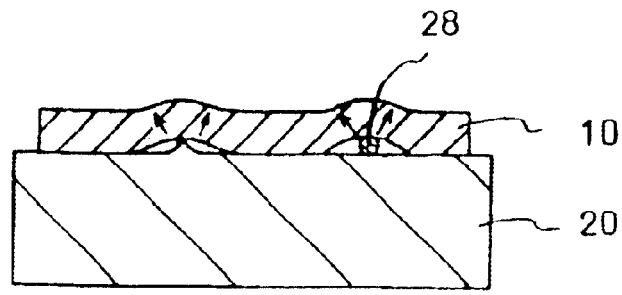
FIGS. 2A–2D are explanation views showing the steps of processing the work piece.
Figure 2B:
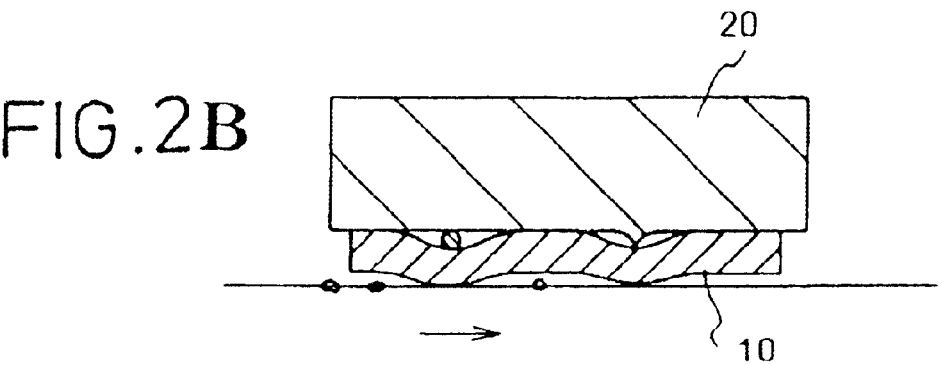
Figure 2C:
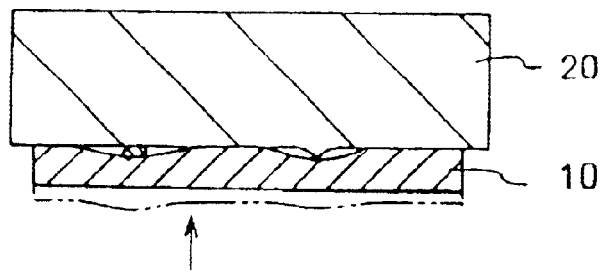

FIG. 2B shows a state of lapping the work piece 10, which has been adhered on the supporting jig 20. FIG. 2C shows a state of completing the lapping step in which the surface of the work piece 10 has been evenly lapped.

Figure 2D:
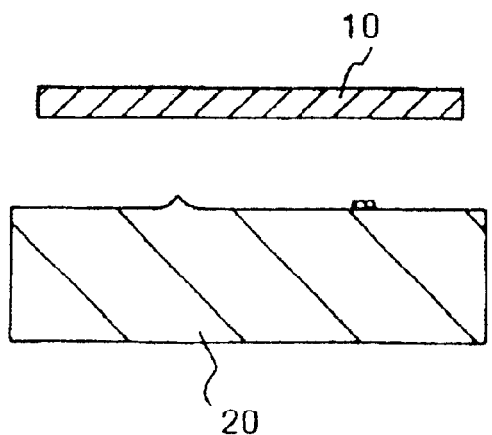

FIG. 2D shows a state in which the work piece has been peeled from the supporting jig 20 after completing the lapping step. In the present embodiment, the work piece 10 is reheated to relieve the stress therein, so that the work piece 10 can be peeled from the supporting jig 20 without greatly curving or deforming the work piece 10.

Figure 3A:
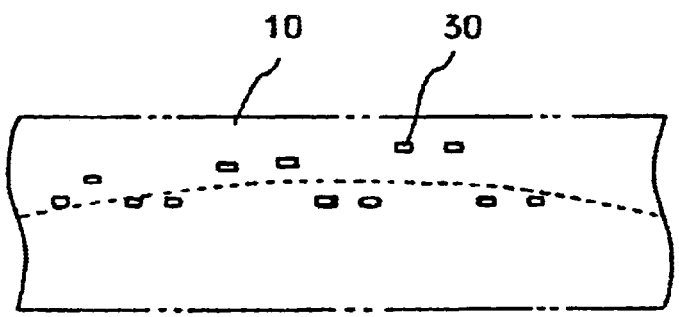
FIGS. 3A and 3B are explanation views showing arrangement of elements in the work piece.
Figure 3B:
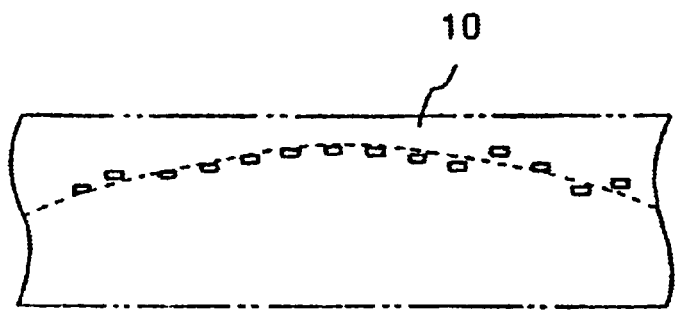

The work piece 10, which is adhered on the supporting jig 20 and lapped, and elements (patterns) 30, which are formed in the work piece 10 and serially arranged in the longitudinal direction of the work piece 10, are shown in FIGS. 3A and 3B.

In the conventional method, when the work piece 10 is adhered, the uneven surface of the jig, dusts in the wax, etc. are transferred thereto, so the elements 30 in the work piece 10 are complexly shifted in the vertical direction as shown in FIG. 3A. On the other hand, in the present embodiment, the work piece 10 is reheated, so that the arranged line of the elements 30, which is viewed from a side of the work piece 10, is adjusted and formed into a smooth parabola line (see a dotted line in FIG. 3B)).

When the work piece 10 is lapped, the jig or jigs can be slightly deformed so as to process the work piece 10 along the arranged line of the elements 30. But the jigs cannot be greatly deformed, so the arranged line should be a smoothly curved line. In the present embodiment, the work piece 10 is reheated, so that the arranged line of the elements 30 is formed into the parabola line and a processing track can be corresponded with the parabola line by deforming the jig or jigs with higher processing accuracy.

These days, the processing accuracy of submicron is required when the film layered magnetic heads are processed. To improve the processing accuracy, it is important to restrict positional difference, in the vertical direction, among the elements 30 in the work piece, and it is also important to adjust the arranged line of the elements 30 to correspond with the smoothly curved line even if the elements 30 are mutually shifted in the vertical direction.

Figure 4:
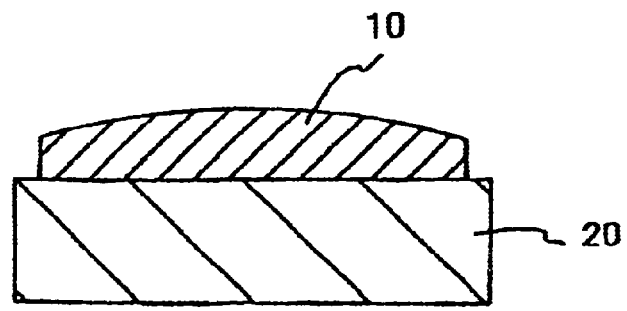
FIG. 4 is an explanation view showing the work piece, which has been lapped.

In the case of lapping the work piece 10 with the supporting jig 20, edges of the work piece 10 are apt to be overprocessed as shown in FIG. 4. In a lapping machine, outer parts or edges of the work piece 10 are ground more than a center part thereof is done and a center part of the jig is pushed and slightly indented, so that the overprocessed parts are formed. More preferably, the work piece 10 is adhered with considering estimated amount of the overprocess.

Figure 5A:
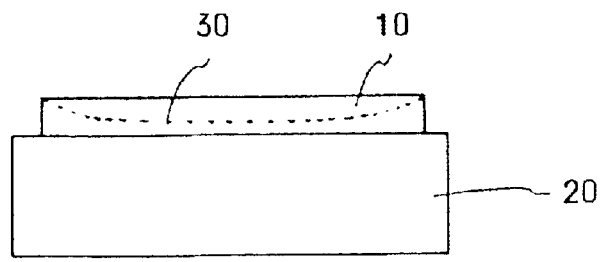
FIGS. 5A–5C are explanation views respectively showing states of adhering the work piece onto the supporting jig.
Figure 5B:
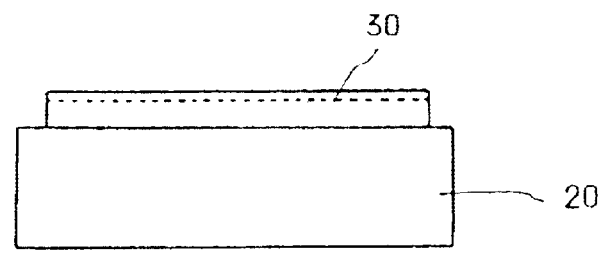
Figure 5C:
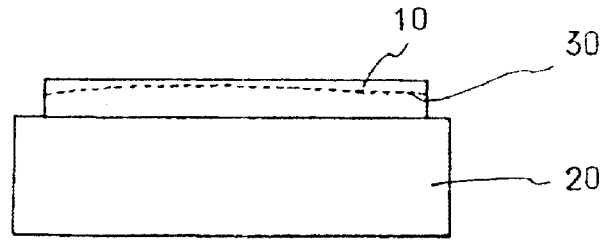

As to the relationship among the shape of the surface of the supporting jig 20, thickness of the wax and degree of parallel between the arranged line of the elements 30 and a cut end face of the work piece 10, there are three cases of adhering the work piece 10 on the supporting jig 20 as shown in FIGS. 5A–5C.

In FIG. 5A, the work piece 10 is adhered on the supporting jig 20, and a center part of the arranged line of the elements 30, which is extended in the longitudinal direction of the work piece 10, is located nearest to the surface of the supporting jig 20. Namely, the center part of the arranged line is curved and projected toward the supporting jig 20. In FIG. 5B, the work piece 10 is adhered on the supporting jig 20, and the arranged line of the elements 30 is approximately parallel to the surface of the supporting jig 20. In FIG. 5C, the work piece 10 is adhered on the supporting jig 20, and a center part of the arranged line of the elements 30, which is extended in the longitudinal direction of the work piece 10, is located farthest from the surface of the supporting jig 20. Namely, the center part of the arranged line is curved and projected upwardly.

In the cases shown in FIGS. 5A and 5B, the center part of the jig is pushed or pressed with considering the estimated amount of overprocessing the edges of the work piece 10. Namely, in the cases that the arranged lines of the elements 30 are the smoothly curved lines as shown in FIGS. 5A and 5B, precise processing can be executed by adjusting the deformation of the jig.

In the case shown in FIG. 5C, if amount of shifting the elements 30 is greater than that of overprocessing the edges of the work piece 10, the deformation of the jig should be adjusted in the reverse direction. If the work piece 10 is reheated and adhered on the supporting jig 20, the arranged line of the elements 30 which is upwardly curved is made more smooth, so that degree of the reverse deformation of the jig can be reduced.

As described above, in the present invention, the work piece can be processed on the supporting jig with higher processing accuracy, the undulation of the work piece can be corrected. Therefore, the magnetic heads, which request the allowance of submicron order, can be processed properly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of processing a magnetic head comprising the steps of:

providing adhesive wax on a surface of a supporting jig to define a waxed surface thereon;

heating a work piece and mounting said heated work piece on said waxed surface without pressing;

cooling said adhesive wax and pressing said work piece onto said waxed surface so as to adhere said work piece thereon with said adhesive wax;

wherein said work piece is a raw bar, said raw bar having been formed into a bar shape by cutting a wafer, and having a plurality of magnetic head elements linearly arranged in said raw bar;

reheating said raw bar work piece until said wax is melted to relieve stress in said work piece;

recooling said adhesive wax without pressing the work piece into said waxed surface; and processing said work piece, wherein the arrangement of the magnetic head elements is considered when said raw bar is processed, wherein said plurality of magnetic head elements are linearly arranged in said work piece in the longitudinal direction thereof, a center part of said linear arrangement is located nearer to the surface of said supporting jig than outer parts of said linear arrangement when said work piece supported by said supporting jig is reheated.

2. The method according to claim 1, wherein said work piece is pressed by pressing means with a shock absorbing member placed between the pressure jig and the work piece, in order to secure the work piece.

3. A method of processing a magnetic head comprising the steps of:

providing adhesive wax on a surface of a supporting jig to define a waxed surface thereon;

heating a work piece and mounting said heated work piece on said waxed surface without pressing;

cooling said adhesive wax and pressing said work piece onto said waxed surface so as to adhere said work piece thereon with said adhesive wax;

wherein said work piece is a raw bar, said raw bar having been formed into a bar shape by cutting a wafer, and having a plurality of magnetic head elements linearly arranged in said raw bar;

reheating said raw bar work piece until said wax is melted to relieve stress in said work piece;

recooling said adhesive wax without pressing the work piece into said waxed surface; and processing said work piece, wherein the arrangement of the magnetic head elements is considered when said raw bar is processed, wherein said plurality of magnetic head elements are serially arranged in said work piece in the longitudinal direction thereof, such that when viewed from a side of said work piece said plurality of said elements generally form a parabola line when said work piece is reheated, and the surface of said supporting jig is deformed according to the said serial arrangement of said plurality of magnetic head elements.

4. The method according to claim 3, wherein a center part of said supporting jig is relatively pressed strongly in the case that the said plurality of magnetic head elements are formed into the parabola line.

5. The method according to claim 3, wherein an end part of said supporting jig is relatively pressed strongly in the case that the said plurality of magnetic head elements are formed into the parabola line.

* * * * *